(12) United States Patent
Peng et al.

(10) Patent No.: US 8,161,502 B2
(45) Date of Patent: Apr. 17, 2012

(54) METHOD AND APPARATUS FOR IMPLEMENTING A TASK-BASED INTERFACE IN A LOGIC VERIFICATION SYSTEM

(75) Inventors: Song Peng, San Jose, CA (US); Ping-sheng Tseng, Saratoga, CA (US); Quincy Shen, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 873 days.

(21) Appl. No.: 12/239,706

(22) Filed: Sep. 26, 2008

(65) Prior Publication Data

US 2010/0083289 A1 Apr. 1, 2010

(51) Int. Cl.
*G06F 9/44* (2006.01)
*G06F 9/455* (2006.01)

(52) U.S. Cl. ........................ 719/330; 716/106

(58) Field of Classification Search .................. 719/310, 719/330; 703/14; 716/106
See application file for complete search history.

(56) References Cited

U.S. PATENT DOCUMENTS

| | | | | |
|---|---|---|---|---|
| 6,026,230 A * | 2/2000 | Lin et al. | ........................ | 703/13 |
| 6,134,516 A * | 10/2000 | Wang et al. | ..................... | 703/27 |
| 7,260,794 B2 * | 8/2007 | Butts | ............................. | 716/106 |
| 7,260,798 B2 * | 8/2007 | Gupta et al. | .................. | 716/104 |
| 8,051,402 B2 * | 11/2011 | Snell | ............................ | 716/136 |
| 2008/0120082 A1 * | 5/2008 | Alexanian et al. | ............. | 703/14 |
| 2008/0120085 A1 * | 5/2008 | Alexanian et al. | ............. | 703/14 |
| 2008/0306721 A1 * | 12/2008 | Yang | .............................. | 703/14 |
| 2009/0204931 A1 * | 8/2009 | Lim et al. | ........................ | 716/5 |

* cited by examiner

*Primary Examiner* — Van Nguyen
(74) *Attorney, Agent, or Firm* — Holland & Knight LLP; Brian J. Colandreo, Esq.; Mark H. Whittenberger, Esq.

(57) ABSTRACT

Method and apparatus for implementing a task-based interface in a logic verification system is described. In some examples, a task server and a context memory are implemented in a hardware accelerator for a task. The task server is configured for communication with the logic design. A task stub configured for execution by a computer for the task is generated. Calls to the task are received from a test bench in the computer at the task stub. Remote procedure call (RPC) channels are established in response to the calls. Values of input arguments for the calls are transferred to the context memory through the RPC channels. Execution of threads of the task in the task server is triggered using the values of the input arguments in the context memory as parametric input.

20 Claims, 6 Drawing Sheets

METHOD AND APPARATUS FOR IMPLEMENTING A TASK-BASED INTERFACE IN A LOGIC VERIFICATION SYSTEM

BACKGROUND OF THE INVENTION

1. Field of the Invention

Embodiments of the invention generally relate to electronic design automation and, more specifically, to a method and apparatus for implementing a task-based interface in a logic verification system.

2. Description of the Related Art

In electronic design automation (EDA), functional verification is the task of verifying that a logic design conforms to its specification before the logic design is manufactured as integrated circuits (ICs). Typically, a test design is established to perform verification processes on the logic design (referred to as a "test bench"). Logic designs and test designs may be described using various languages, such as hardware description languages (HDLs) or other more abstract languages (e.g., synthesizable SystemC). Functional verification can be performed using a simulation acceleration or emulation process, where the logic design is mapped into a hardware accelerator or emulator to provide a design under verification (DUV), and the test bench is executed by a simulator on a computer or workstation. Such simulation acceleration/emulation systems allow a design to run much faster than pure software simulation on only a general-purpose computer or workstation.

Typically, the test bench communicates with the DUV using a signal-based interface implemented over a communication link between the computer and the hardware accelerator. The signal-based interface can be defined using low-level signal ports in the test and logic designs. Some languages, such as Verilog HDL, include the capability of higher level inter-module communication using task/function calls ("task interface"). Use of such a task interface between the test bench and the DUV can achieve significant increases in communication speed over a signal-based interface. However, there are several technical challenges for supporting a task interface across the simulator/accelerator partition. The definition of a task/function in the test bench can consume simulation time. The caller of a task can invoke a task by non-blocking fork operations to create dynamic threads. Multiple processes can call the same task instance concurrently. Moreover, the number of calling processes is not known at compile time. Such challenges have heretofore prevented the use of a task interface between the test bench and DUV in a simulation acceleration/emulation system.

Accordingly, there exists a need in the art for a method and apparatus for implementing a task-based interface in a logic verification system.

SUMMARY OF THE INVENTION

Aspects of the invention relate to a method of providing an interface between a test bench executing in a computer and a logic design executing in a hardware accelerator, the computer being coupled to the hardware accelerator. In some embodiments, the method includes implementing a task server and a context memory in the hardware accelerator for a task. The task server is configured for communication with the logic design. A task stub configured for execution by the computer for the task is generated. Calls to the task are received from the test bench at the task stub. Remote procedure call (RPC) channels are established in response to the calls. Values of input arguments for the calls are transferred to the context memory through the RPC channels. Execution of threads of the task in the task server is triggered using the values of the input arguments in the context memory as parametric input.

Aspects of the invention relate to an apparatus for providing an interface between a test bench executing in a computer and a logic design executing in a hardware accelerator, the computer being coupled to the hardware accelerator. In some embodiments, the apparatus includes a means for implementing a task server and a context memory in the hardware accelerator for a task, the task server configured for communication with the logic design; a means for generating a task stub configured for execution by the computer for the task, the task stub configured to receive calls to the task from the test bench and establish remote procedure call (RPC) channels in response to the calls; and a means for transferring values of input arguments for the calls to the context memory through the RPC channels and triggering execution of threads of the task in the task server using the values of the input arguments in the context memory as parametric input.

Aspects of the invention relate to a logic verification apparatus. In some embodiments, a hardware accelerator is provided having a logic design under verification, a task server, and a context memory implemented therein. The task server is configured for communication with the logic design and to execute threads of a task. The context memory is configured to store context variables for the threads executing on the task server. A computer is provided, coupled to the hardware accelerator, and having a test bench, a task stub, a remote procedure call (RPC) memory, and a control module. The task stub is configured to receive calls from the test bench and manage RPC channels in the RPC memory in response thereto. The control module is configured to trigger execution of the treads of the task in the task server in response to the calls to the task received by the task stub, and transfer arguments of the task between the RPC memory and the context memory through the RPC channels.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Throughout the drawings like reference numerals refer to like elements.

DETAILED DESCRIPTION

Figure 1:
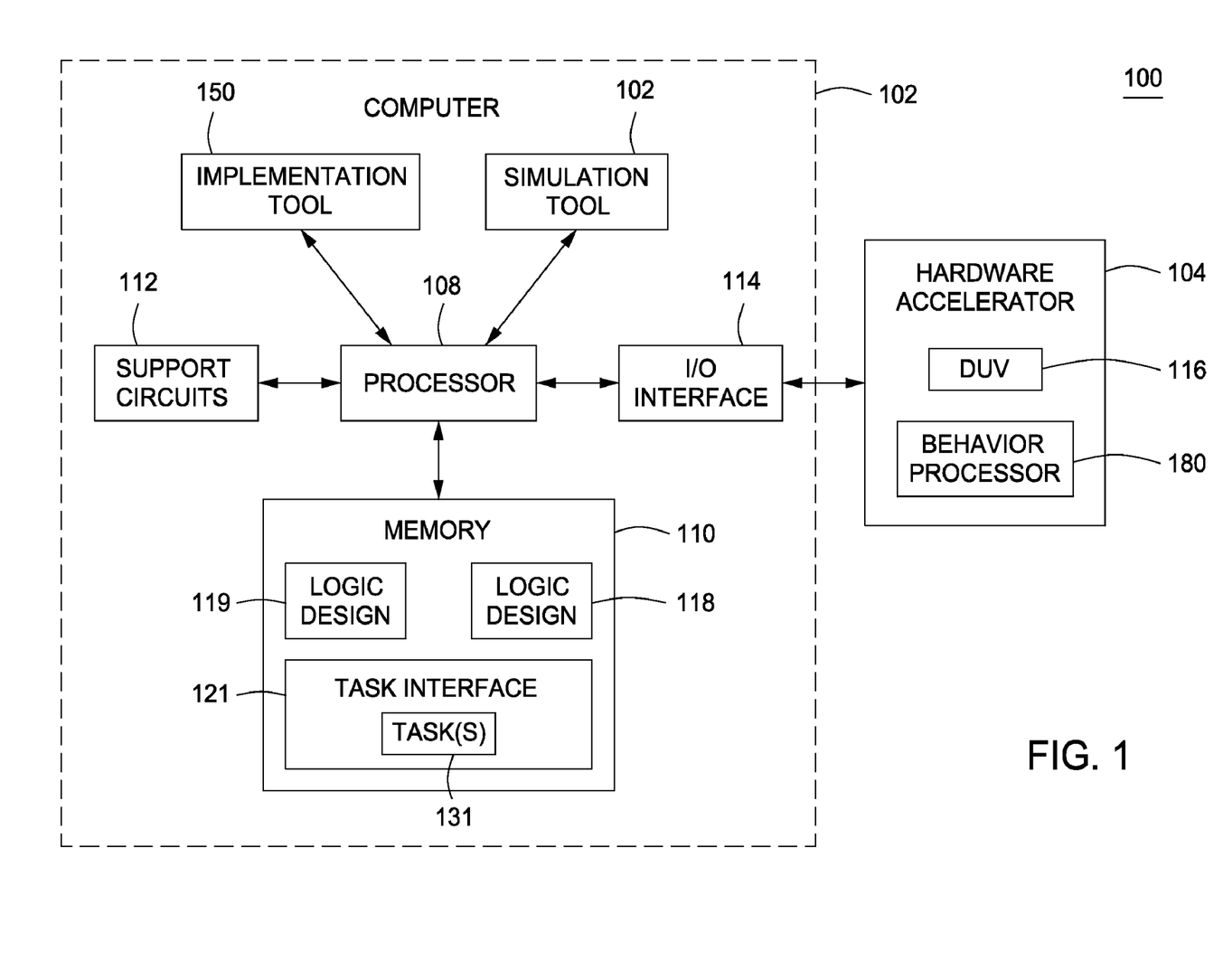
FIG. 1 is a block diagram depicting an exemplary embodiment of a logic verification system in accordance with one or more aspects of the invention.

FIG. 1 is a block diagram depicting an exemplary embodiment of a logic verification system 100 in accordance with one or more aspects of the invention. The system 100 includes a computer 102 coupled to a hardware accelerator 104 via a communication link 106. The computer 102 may comprise any type of general-purpose or specific-purpose computer. For example, the computer 102 may include a processor 108, a memory 110, various support circuits 112, and an I/O interface 114. The processor 108 may include one or more microprocessors known in the art. The support circuits 112 for the processor 108 include conventional cache, power supplies, clock circuits, data registers, I/O interfaces, and the like. The I/O interface 114 may be directly coupled to the memory 110 or coupled through the processor 108. The I/O interface 114 may also be configured for communication with the emulator 104 via the communication link 106. The memory 110 may include one or more of the following random access memory, read only memory, magneto-resistive read/write memory, optical read/write memory, cache memory, magnetic read/write memory, and the like, as well as computer readable media, as described below.

The hardware accelerator 104 may comprise any type of acceleration, acceleration/emulation, or emulation platform. For example, the hardware accelerator 104 may include one or more programmable logic devices (PLDs), such as field programmable gate arrays (FPGAs). The communication link 106 comprises any type of bus or link for the transfer of data between the computer 102 and the hardware accelerator 104.

The computer 102 may be loaded with an implementation tool 150 and a simulation tool 152. The implementation tool 150 is configured to translate a synthesizable hardware description of a logic design 119 into a gate-level description, which is then translated into a physical description that can be loaded into the hardware accelerator 104 as a design under verification (DUV) 116. The gate-level description produced by the implementation tool 150 may include a register transfer level (RTL) netlist or the like. The physical description produced by the implementation tool 150 may comprise a bitstream that can be loaded to configure one or more PLDs to implement the DUV 116.

The simulation tool 152 is configured to compile and execute a test bench 118. The test bench 118 is configured to execute one or more verification processes on the DUV 116 for functionally verifying the logic design 119. The logic design 119 and test bench 118 may be specified using a hardware modeling language, such as hardware description languages (HDLs) (e.g., VHDL or Verilog) or higher-level languages, such as SystemC, System Verilog, and the like, or programming languages, such as C, C++, and the like. In some cases, the logic design 119 may include behavioral portions that are not directly synthesizable. Such behavioral portions of the logic design 119 can be modeled in software (e.g., compiled and executed via the simulation tool 152). Likewise, the test bench 118 may include synthesizable portions capable of being modeled in hardware. Such synthesizable portions of the test bench 118 may be synthesized and implemented in the hardware accelerator 104. The term "tool" as used herein is meant to encompass software implementations, hardware implementations, or a combination of hardware and software implementations.

In accordance with aspects of the invention, a task interface 121 is configured as an interface between the test bench 118 and the logic design 119. The task interface 121 may include one or more tasks 130 specified using a hardware modeling language, programming language, and/or the like. A task 130 provides a logical interface between the test bench 1 18 and the logic design 1 19. The test bench 1 18 may include one or more processes that call a task 130 in the task interface 121 and pass the input argument(s) as defined by the task 130. When executed, a task 130 performs a function with the argument(s) from the test bench 118 as parametric input. A task 130 may include the communication of signals to and from the logic design 119. As a result of execution, a task 130 may produce output data, which may then be returned to the calling process in the test bench 118. Embodiments for physically implementing the task interface 121 are described below.

Figure 2:
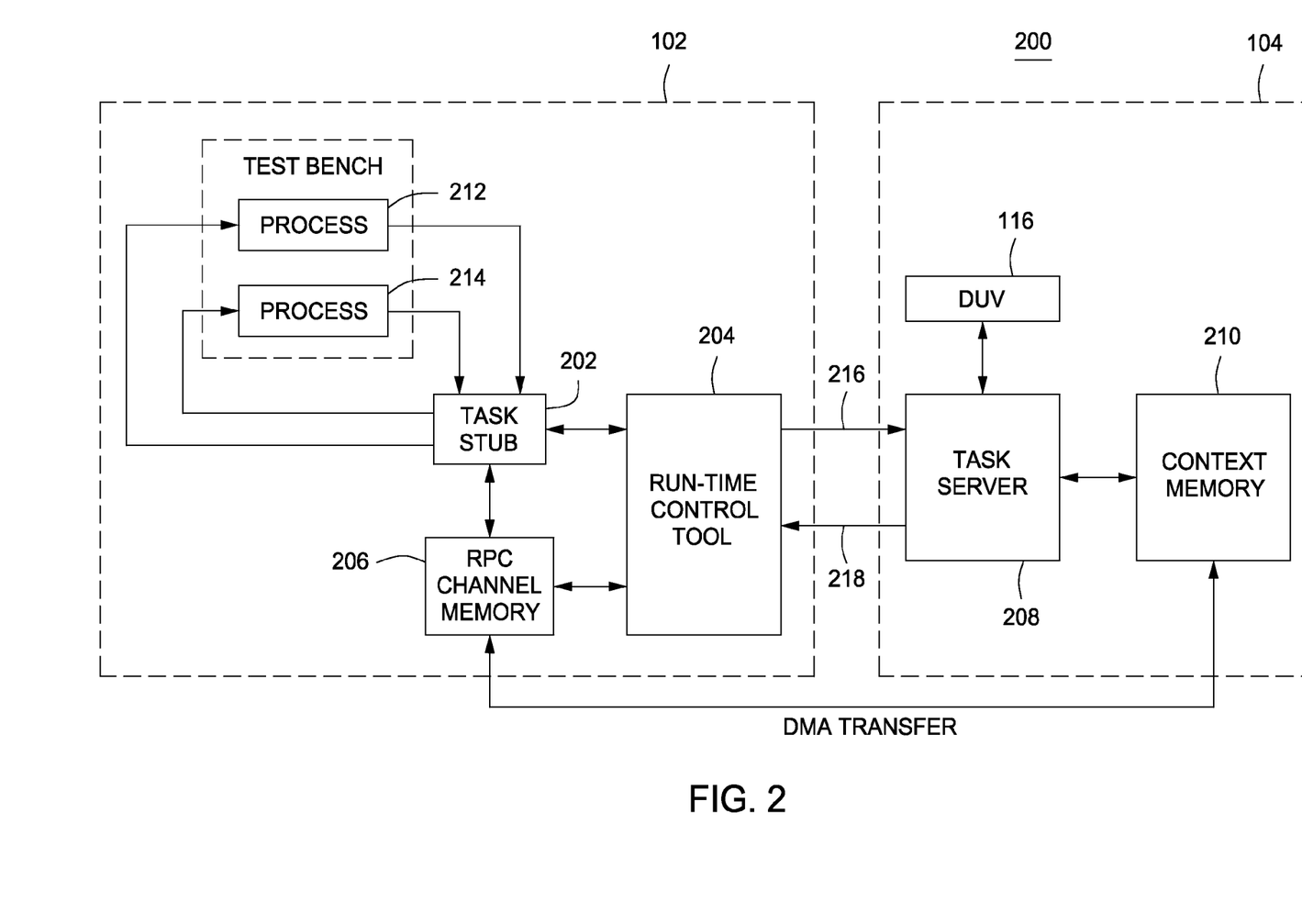
FIG. 2 is a block diagram depicting an exemplary embodiment of an interface between a computer executing the test bench and a hardware accelerator executing a design under verification.

FIG. 2 is a block diagram depicting an exemplary embodiment of an interface 200 between the computer 102 executing the test bench 118 and the hardware accelerator 104 executing the DUV 116. The interface 200 can include a physical implementation of the task interface 121 described above. For purposes of clarity by example, the interface 200 is described as having a single task 130. Those skilled in the art will appreciate from the description below that the interface 200 may include more than one task each configured similarly. The interface 200 includes a task stub 202, a run-time controller 204, a remote procedure call (RPC) channel memory 206, a task server 208, and a context memory 210. The task stub 202, the run-time controller 204, and the RPC channel memory 206 are implemented in the computer 102. One or more of the run-time controller 204 or the task stub 202 may be separate elements in the computer 102 or may be part of the simulation tool 152. The RPC channel memory 206 may be implemented in the memory 110. For example, the RPC channel memory 206 may be an address space in the memory 110 maintained by the simulation tool 152. The task server 208 and the context memory 210 are implemented in the hardware accelerator 104. The run-time controller 204 is configured to provide an input signal 216 (referred to as a primary input signal 216) to the task server 208, and receive an output signal 218 from the task server 208.

The test bench 118 may include one or more processes that call the task 130 in order to communicate with the logic design 118. In the present example, processes 212 and 214 are shown, but the test bench 118 may include more or less processes. The functionality of the task 130 is performed by the task server 208 in the hardware accelerator 104. In the simulation tool 152, the task stub 202 is configured to manage remote procedure calls for communicating with the task server 208. The task stub 202 is defined to be an automatic and time consuming process. In the processes 212 and 214, the simulation tool 152 directs calls to the task 130 to the task stub 202. Each call to the task stub 202 transfers the execution thread of the calling process to the task stub 202. Since multiple processes can call the same task 130, and since a single process can dynamically fork multiple task execution threads, multiple threads of the task stub 202 can be active at the same simulation time. In the present example, the two processes 212 and 214 are actively calling the same task 130 and may become two execution threads of the task stub 202. The simulation tool 152 may manage threading for the task stub 202.

Figure 7:
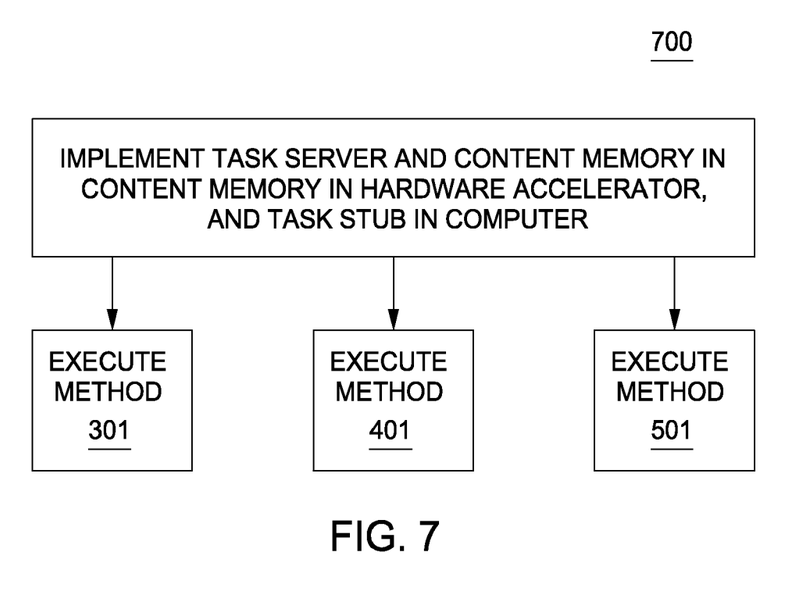
FIG. 7 is a flow diagram depicting an exemplary embodiment of a global method of providing an interface between a test bench and a logic design in accordance with one or more aspects of the invention.

FIG. 7 depicts a flow diagram of an exemplary embodiment of a global method 700 for providing the interface 200 between the test bench 118 executing in the computer 102 and the logic design 119 executing in the hardware accelerator 104 in accordance with one or more aspects of the invention. The global method 700 may be understood with simultaneous reference to FIGS. 1-2, as well as a method 301 shown in FIG. 3 performed by the task stub 202, a method 401 shown in FIG. 4 performed by the run-time controller 204, and a method 501 shown in FIG. 5 performed by the task server 208.

The global method 700 begins at step 702, where the task server 208 and the context memory 210 are implemented for the task 130 in the hardware accelerator 104, and the task stub 202 is implemented for the task 130 in the computer 102. Embodiments for implementing the task server 208 from a definition of the task 130 are described below. The method 700 proceeds from step 702 to execute methods 301, 401, and 501.

Figure 3:
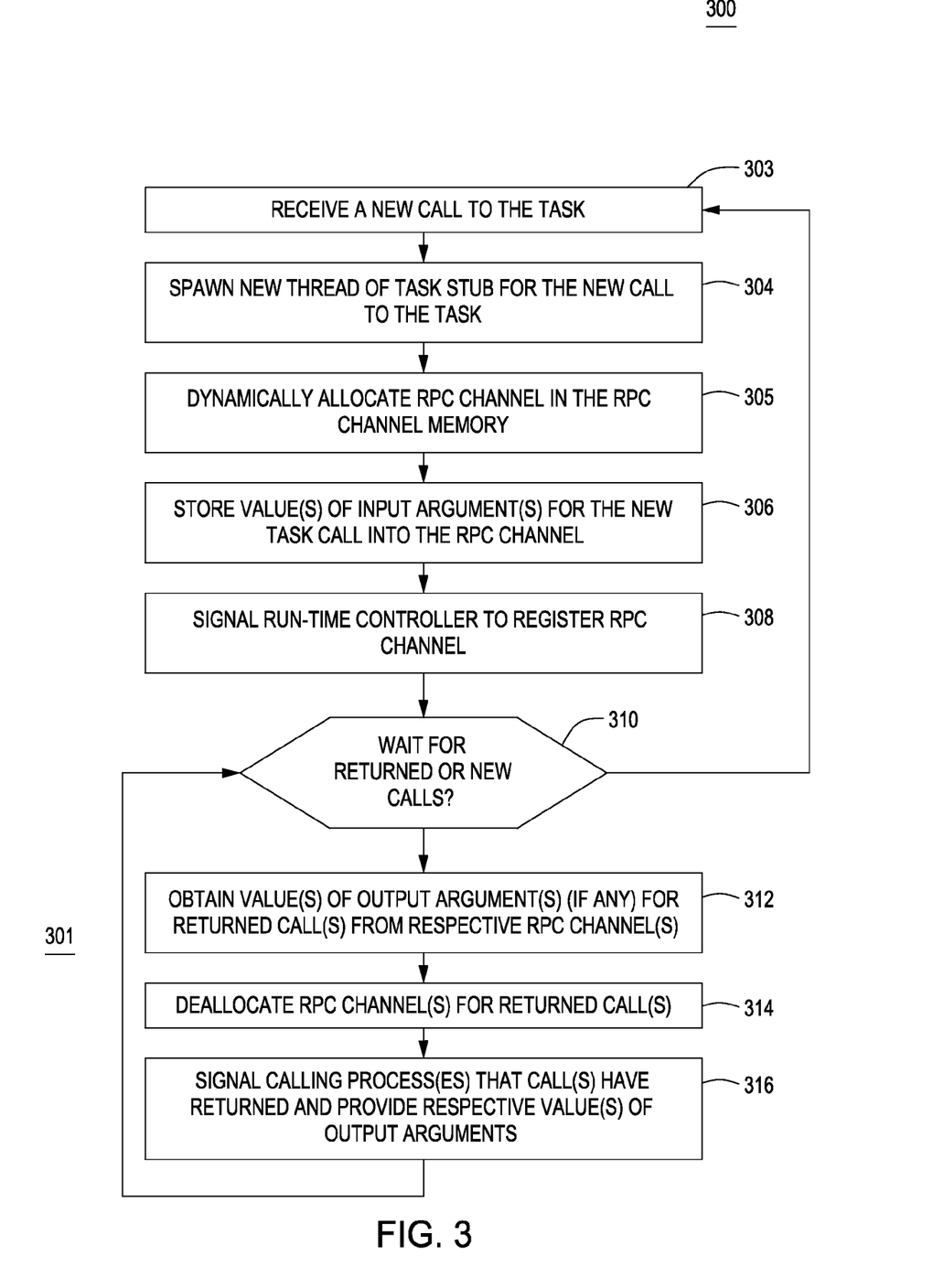
FIG. 3 is a flow diagram depicting an exemplary embodiment of a method of processing task calls from a test bench in accordance with one or more aspects of the invention.

Referring to FIG. 3, the method 301 then begins at step 303, where the test bench 118 makes a new call to the task 130 (e.g., via one of the processes 212 and 214), which is received by the task stub 202. A new call is differentiated from a previous call, which the test bench 118 previously made and is now waiting for a return. As described below, a call to the task 130 effectively results in creation of a thread of the task 130. As such, an outstanding call to the task 130 from the test bench 118 may also be referred to as an "active thread" of the task 130.

At step 304, where a thread of the task stub 202 is spawned for the new call to the task 130. At step 305, the task stub 202 dynamically allocates an RPC channel in the RPC channel memory 206. That is, each new call to the task 130 spawns a thread of the task stub 202, and each thread of the task stub 202 allocates an RPC channel. Thus, each new active thread of the task 103 is associated with a respective one RPC channel.

At step 306, the task stub 202 stores value(s) for the input argument(s) of the task 130 for the new call into the RPC channel. That is, the task 130 may include one or more input arguments, and each new call to the task 130 includes specific value(s) for the input argument(s). At step 308, the task stub 202 signals the run-time controller 204 to register the RPC channel. At step 310, the task stub 202 then waits for indication that any call(s) to the task 130 returned, or that a new call has been received. If a new call is received, the method 301 returns to step 304 and repeats. If any call(s) returned, the method 301 proceeds to step 312. Otherwise, the method 301 waits at the step 310. Notably, since the task stub 202 is multi-threaded, the branches to step 304 and step 312 from the step 310 may occur concurrently. That is, one or more new calls may be processed by one or more new threads of the task stub 202, while returning call(s) is/are processed by previously spawned thread(s) of the task stub 202.

If at step 310 call(s) is/are returned, the method 301 proceeds to the step 312. At step 312, the task stub 202 obtains values of the output arguments (if any) for the returned call(s) from the respective RPC channels in the RPC channel memory 206. At step 314, the task stub 202 de-allocates the RPC channel(s) for the returned call(s). At step 316, the task stub 202 signals the calling process(es) that that call(s) have returned, providing the respective values of the output argument(s) (if any). The method 301 then returns to step 310.

Figure 4:
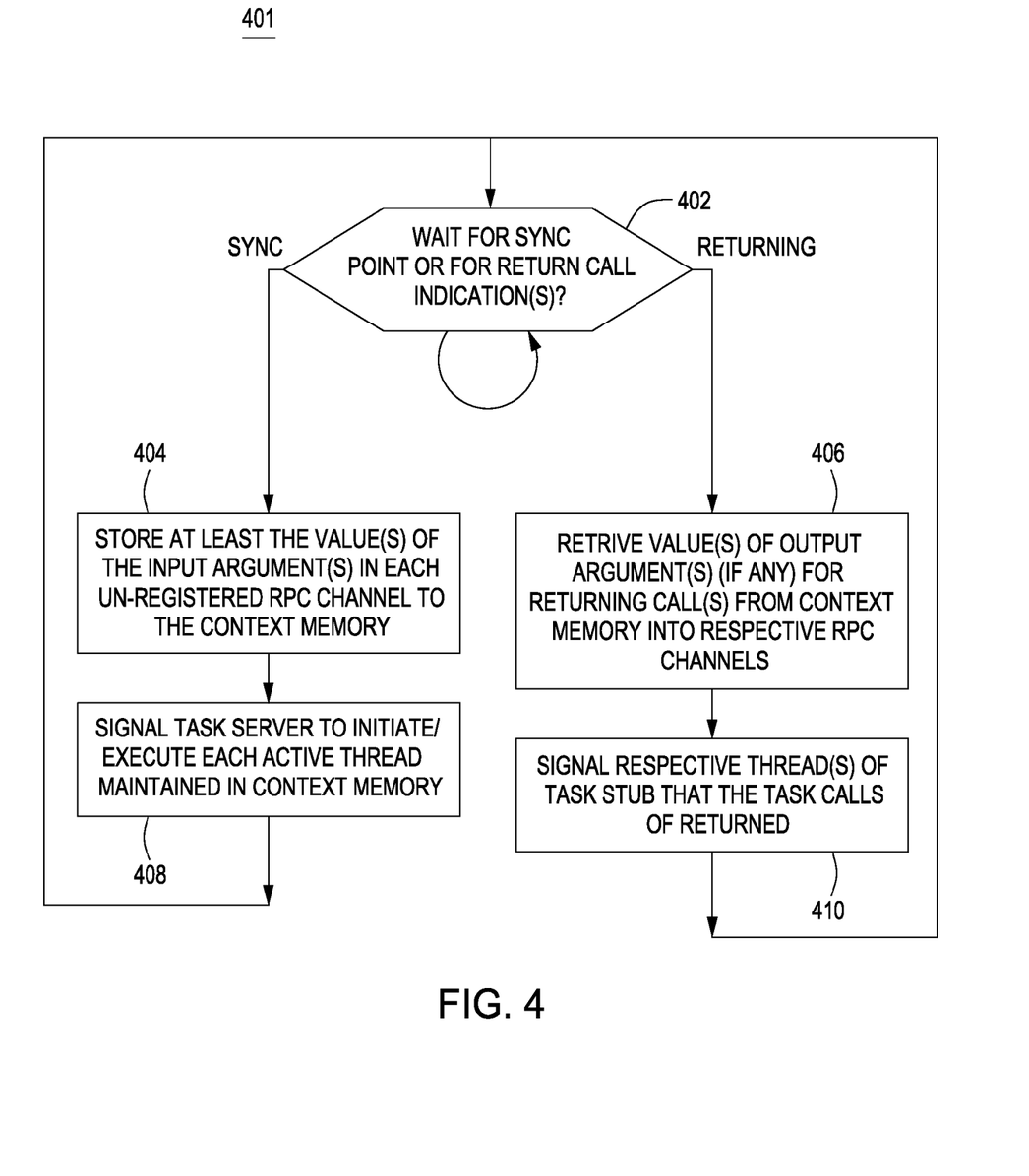
FIG. 4 is a flow diagram depicting an exemplary embodiment of a method of controlling task thread execution in accordance with one or more aspects of the invention.

Referring now to FIG. 4, the method 401 begins at step 402, where the run-time controller 204 waits for a synchronization point between the test bench 118 and the logic design 119, or waits for an indication that a task call has returned. That is, the hardware accelerator 104 may operate independently from test bench control until a synchronization point, at which time the test bench 118 may provide data to the hardware accelerator 104. The hardware accelerator 104 may also send data to the computer 102 during a synchronization point. In some embodiments, the hardware accelerator 104 may send data to the computer 102 at anytime between synchronization points. Upon the occurrence of a synchronization point, the method 401 proceeds to step 404. Upon an indication that a task call has returned, the method 401 proceeds to step 406. Otherwise, the method 401 waits at step 402. Notably, the branches to step 404 and step 406 from the step 402 may occur concurrently. That is, a synchronization point may be processed while returning task call(s) is/are processed.

At step 404, the run-time controller 204 stores at least the value(s) of the input argument(s) in each un-registered RPC channel to the context memory 210. That is, the task stub 202 may have allocated one or more RPC channels in response to one or more new task calls between synchronization points. In general, the RPC channel memory 206 may include multiple RPC channels for concurrent active threads of the task 130, some of which have been previously registered by the run-time controller 204, and other(s) of which are un-registered (i.e., for new task calls). The transfer between the RPC channel memory 206 and the context memory 210 may be implemented using direct memory access (DMA) hardware channels between the computer 102 and the hardware accelerator 104. DMA techniques are well known in the art.

Notably, the task 130 includes variables that define a context for the task ("context variables"). Context variables may include the input arguments, task scope automatic variables, and output arguments. As described below, the definition of the task 130 is converted to produce a finite state machine (FSM), which is implemented as the task server 208. Accordingly, the context variables for the task 130 may further include state variables for the FSM. In addition to the values for the input arguments, at step 404, the run-time controller 204 may set initial values to the remaining variables in the context variables for each new task call (e.g., initial values for the task-scope automatic variables, output arguments, and state variables). Once the context variables are set for a given task call, a thread of the task is initialized. Thus, each set of values for the context variables corresponds to an active thread of the task 130.

At step 408, the run-time controller 204 signals the task server 208 to initiate and/or execute each active thread maintained by the context memory 210. The run-time controller 204 may signal the task server 208 using a trigger signal, referred to as the primary input signal 216. The method 401 returns from step 408 to step 402.

At the step 402, the run-time controller 204 determines whether any of the task calls (active threads) has or have returned (i.e., completed). If one or more task calls return, the method 401 proceeds from step 402 to step 406. At step 406, the run-time controller 204 retrieves value(s) of the output argument(s) (if any) for the returning task call(s) from the context memory 210 into the respective RPC channel(s) in the RPC channel memory 206. The transfer between the context memory 210 and the RPC channel memory 206 may be implemented using DMA. At step 410, the run-time controller 204 signals the respective thread(s) of the task stub 202 that the task call(s) returned. The method 401 returns to step 402.

Figure 5:
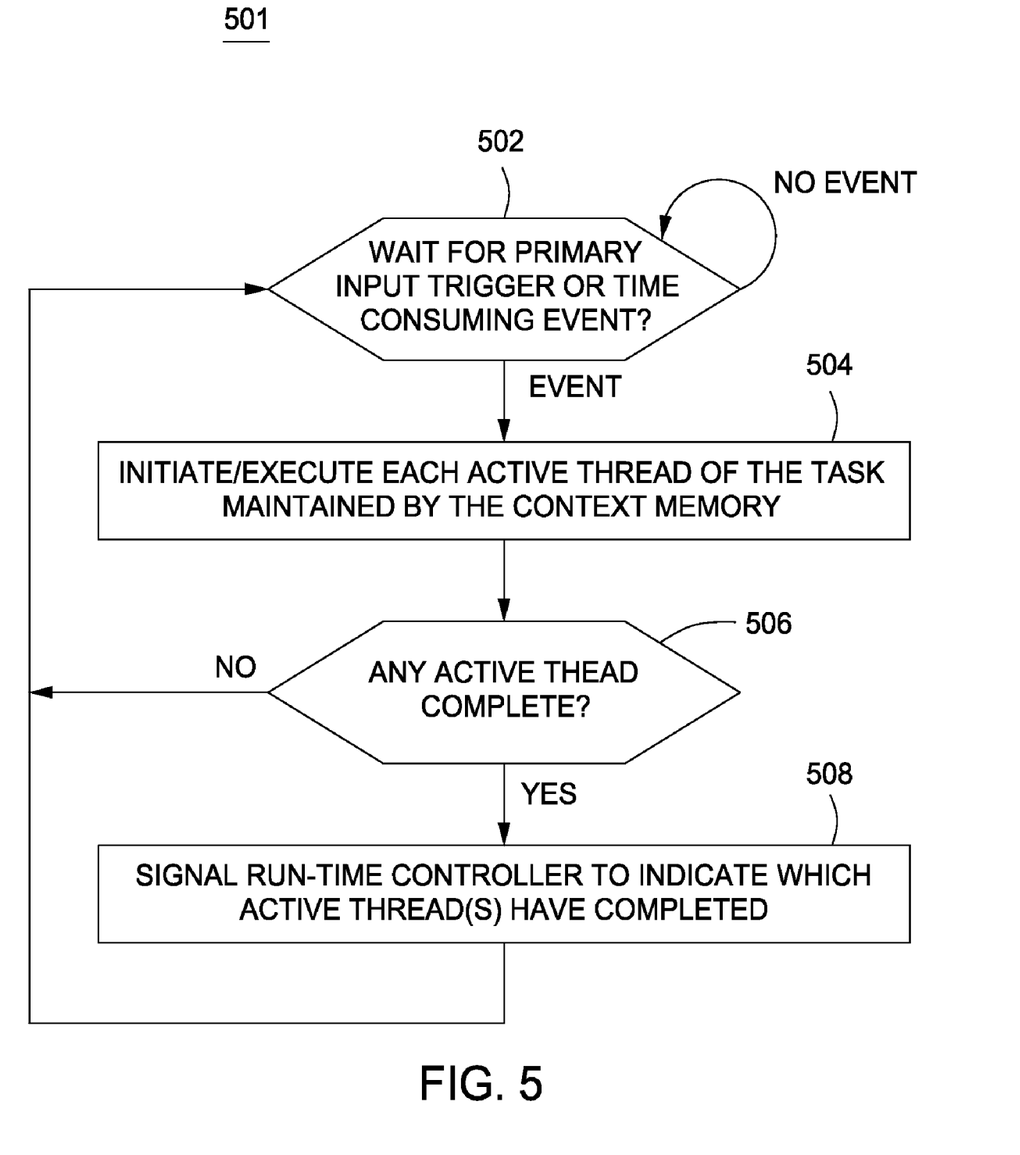
FIG. 5 is a flow diagram depicting an exemplary embodiment of a method of executing threads of a task in a hardware accelerator in accordance with one or more aspects of the invention.

Referring now to FIG. 5, the method 501 begins at step 502, where the task server 208 waits for assertion of the primary input signal, or for occurrence of a time consuming event defined by the task. In particular, the task server 208 may be an FSM with a single wait state. The FSM remains in the wait state until occurrence of any of the following events: (1) assertion of the primary input signal 216 ("trigger event" for triggering initiation/execution of active thread(s)) or; (2) occurrence of any time consuming event defined by the task. If any such event occurs, the method 501 proceeds to step 504. Otherwise, the method 501 waits at step 502.

At step 504, the FSM of the task server 208 initiates/executes each active thread maintained by the context memory 210. Initiation/execution of an active thread includes loading respective values of the context variables and a transition from the wait state to one or more active states. In the active state(s) for an active thread, the task server 208 performs one or more operations using one or more values of the context variables. In addition, the task server 208 may communicate with the DUV 116. For each active thread, the task server 208 may transition to one or more active states before either returning to the wait state or proceeding to a "done" state that signals completion of the active thread. While transitioning through the active states, the task server 208 may produce value(s) for output argument(s) in the context variables for each active thread. The task server 208 may initiate/execute multiple active threads in parallel. Embodiments of implementation of the task server 208 are described in more detail below.

At step 506, the task server 208 determines whether any active thread has completed (e.g., entered the "done" state). If not, the method 501 returns to step 502. If one or more active threads has/have completed, then the method 501 proceeds to step 508. At step 508, the task server 208 signals the run-time controller 204 to indicate which of the active threads has or have completed. The task server 208 may signal the run-time controller 204 using the output signal 218. The method 501 then returns to step 502.

For purposes of clarity by example, the implementation of the task interface 200 is described above with respect to a single task 130. Those skilled in the art will appreciate that the interface 200 may implement multiple tasks 130. In such case, multiple task stubs 202 may be provided, one for each of the tasks 130. In addition, multiple pairs of task server 208/context memory 210 are implemented in the hardware accelerator 104, one for each of the tasks 130. Note that the context memory 210 may be a single memory with multiple address spaces for the multiple tasks 130. The method 700 may be performed separately (and in parallel) for each of the tasks 130.

A definition for the task server 208 may be generated from a definition of the task 130 by the implementation tool 150. As noted above, the task server 208 may be implemented as an FSM having a single wait state. The FSM waits for either assertion of the primary input signal 216 or occurrence of a time consuming event as specified by the task 130. In case of either event, the FSM initiates/executes each active thread maintained in the context memory 210. The task server 208 may be defined as follows, where "task_fsm" is a definition of the FSM for the task server 208, "task_event" is any of one or more time consuming events defined by the task 130, and "host_trigger_event" is the primary trigger event.

```
always@(<task_event> or <host_trigger_event>) begin
    foreach(active thread in the context memory) begin
        Load <context variables> from context memory;
        Run <task_FSM> to <fsm_wait> or <fsm_done> state;
        Store <context variables> to context memory;
    end
    if (any active thread in <fsm_done> state)
        Send completion signal to run-time controller by tbcall;
end
```

The states "fsm_wait" and "fsm_done" are defined below.

In accordance with aspects of the invention, the implementation tool 150 may convert a time-consuming task definition into a FSM definition to implement the task server 208. A time-consuming task definition may include one or more time-consuming events. For example, consider the definition of the following task "T1":

```
Task T1 (input A, input B, output C);
    int i;
    begin
        @(ev1)
        i = 0; C = 0;
        while (i < A) begin
            @(ev2)
            C = B[i] ^ C; i = i + 1;
        end
    end
```

In the task T1, variables A and B are input arguments, and variable C is an output argument. The variable i is an automatic task-scope variable. The task T1 includes two time-consuming events, designated ev1 and ev2. The task T1 waits for the event ev1 after it begins, and waits for the event ev2 in each iteration of the while loop. The events are "time-consuming" in that the task does not continue execution until such events occur.

Figure 6:
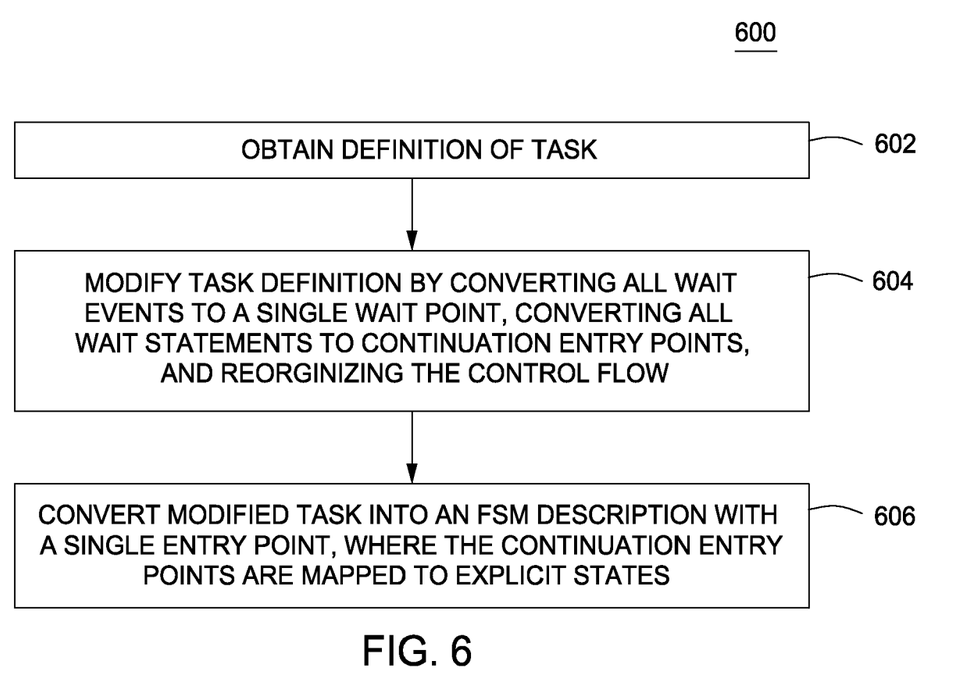
FIG. 6 is a flow diagram depicting an exemplary embodiment of a method for converting a task definition into a finite state machine implementation in accordance with one or more aspects of the invention.

FIG. 6 is a flow diagram depicting an exemplary embodiment of a method 600 for converting a task definition into an FSM implementation in accordance with one or more aspects of the invention. The method 600 may be performed during the step 702 in the method 700 to implement the task server 208 from a definition of the task 130. The method 600 may be performed by the implementation tool 150. Aspects of the method 600 may be understood with reference to the example task T1 defined above and with respect to FIGS. 1 and 2.

The method 600 begins at step 602, where a definition of the task 130 is obtained. At step 604, the task definition is modified by converting all wait events to a single wait event point, converting all wait statements to continuation entry points, and reorganizing the control flow. The modified definition of the task T1 becomes the following:

```
Event_detector X1 (ev1_happen, ev1);
Event_detector X2 (ev2_happen, ev2);
Task T1 (input A, input B, output C);
    int i;
    begin
    L1:
        next_entry = L2;
        goto WAIT;
    L2:
        if (!ev1_happen) goto WAIT;
        while (i < A) begin
            next_entry = L3;
            goto WAIT;
```

-continued

```
        L3:
            if (!ev2_happen) goto WAIT;
            C = B[i] ^ C; i = i + 1;
        end
        goto DONE;
    WAIT: @(ev1 or ev2) goto next_entry;
    DONE: return;
    end
```

The task T1 as modified converts the multiple wait events ev1 and ev2 into a single wait event, labeled as WAIT. The wait statements @(ev1) and @(ev2) in the task T1 are converted into continuation entry points, labeled as L1, L2, and L3. The control flow of the task T1 is modified with insertion of "goto" statements, some of which are conditioned on the occurrence of events. The control flow of the task T1 as modified is: (1) begin at continuation entry point L1; (2) then to the WAIT point; (3) then to L2 if either ev1 or ev2 occurs; (4) if event ev1 did not occur, then back to WAIT, otherwise perform the assignment operation and begin the while loop; (5) then back to the WAIT point; (6) then to L3 if either ev1 or ev2 occurs; (7) if event ev2 did not occur, then back to the WAIT point, otherwise perform assignment operations and continue the while loop; and (8) then to the DONE point if the while loop exits. The variables ev1_happen and ev2_happen are Boolean flags that indicate whether the respective events ev1 and ev2 have occurred. The event detectors X1 and X2 set the flags ev1_happen and ev2_happen to true if the events ev1 and ev2 occur, respectively. The WAIT point includes a single wait event of @(ev1 or ev2).

At step 606, the modified task definition is converted into an FSM description with a single entry point, where the continuation entry points are coded as explicit states in the FSM. That is, all time consuming wait conditions in the original task description become explicit states in the FSM description. In step 606, the conversion of the task T1 results in the following:

```
Task T1 (input A, input B, output C);
    int i;
begin
fsm_state = L1; fsm_done = FALSE;
while (!fsm_done) begin
    fsm_wait = FALSE;
    while (!(fsm_wait || fsm_done)) begin: task_FSM
        case (fsm_state) begin
            L1: begin
                fsm_state = L2;
                fsm_wait = TRUE;
            end
            L2: begin
                if (!ev1_happen)
                    fsm_wait = TRUE;
                else begin
                    i = 0; C = 0;
                    fsm_state = L2_1;
                end
            end
            L2_1: begin
                if (i < A)
                    fsm_state = L2_2;
                else
                    fsm_done = TRUE;
            end
            L2_2: begin
                fsm_state = L3;
                fsm_wait = TRUE;
            end
            L3: begin
                if (!ev2_happen)
                    fsm_wait = TRUE;
                else begin
                    C = B[i] ^ C; i = i + 1;
                    fsm_state = L2_1;
                end
            endcase
        end // task_FSM
        if (fsm_wait) @(ev1 or ev2);
    end // FSM done loop
endtask
```

In the example of task T1, the continuation entry points L1, L2, and L3 become states L1, L2_1, L2_2, and L3 in the task_FSM state machine. The state machine task_FSM includes a single entry point (e.g., the while loop). After final transformation of the task T1, the context variables are the input arguments A and B, the output argument C, the task-cope variable i, and the state variables fsm_done, fsm_state, and fsm_wait. The implementation tool 150 can synthesize and implement FSM description of the task produced by the method 600 for loading into the hardware accelerator 104. The method 600 may be repeated for each task 130 in the task interface 121.

Referring to FIGS. 1 and 2, in some embodiments, the hardware accelerator 104 may include a behavior processor 180. The FSM implementation of the task server 208 meets the behavior processor requirements and can be directly compiled into the behavior processor 180. The behavior processor 180 provides an architecture for implementing behavioral aspects of a logic design (e.g., HDL code that is not directly synthesizable). Behavior processors are well known in the art.

An aspect of the invention is implemented as a program product for use with a computer system. Program(s) of the program product includes functions of the embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive, hard-disk drive, read/writable CD, read/writable DVD, FLASH memory, or the like).

While the foregoing is directed to embodiments of the present invention, other and further embodiments of the invention may be devised without departing from the basic scope thereof, and the scope thereof is determined by the claims that follow.

What is claimed is:

1. A method of providing an interface between a test bench executing in a computer and a logic design executing in a hardware accelerator, the computer being coupled to the hardware accelerator, the method comprising:
    implementing a task server and a context memory in the hardware accelerator for a task, the task server configured for communication with the logic design;
    generating a task stub configured for execution by the computer for the task;
    receiving calls to the task from the test bench at the task stub;
    establishing remote procedure call (RPC) channels in response to the calls;
    transferring values of input arguments for the calls to the context memory through the RPC channels; and triggering execution of threads of the task in the task server using the values of the input arguments in the context memory as parametric input.

2. The method of claim 1, wherein the step of receiving the calls comprises:

transferring execution threads of at least one process in the test bench to threads of the task stub.

3. The method of claim 1, wherein the step of establishing the RPC channels comprises:

dynamically allocating an RPC channel from an RPC channel memory as each of the calls is received.

4. The method of claim 1, wherein the task includes a set of context variables, the set of context variables including the input arguments and output arguments, and wherein the method comprises:

executing each of the threads in the task server; and storing and retrieving values for at least a portion of the context variables in the context memory during execution of each of the threads by the task server.

5. The method of claim 4, further comprising:

receiving an indication that the task server has completed execution of at least one of the threads of the task;

obtaining, from the context memory through at least one of the RPC channels, values of the output arguments of the task generated by the at least one thread; and returning the values of the output arguments from the task stub to the test bench.

6. The method of claim 1, wherein the task server comprises a finite state machine (FSM) with a single wait state, the FSM configured to transition from the wait state in response to any of the following events: a trigger event for triggering execution of a thread; or at least one time consuming event specified in the task.

7. The method of claim 6, further comprising:

executing each of the threads in the task server in response occurrence of the trigger event or the at least one time consuming event.

8. The method of claim 1, where the step of implementing the task server comprises:

converting all wait events in a definition of the task to a single wait point, converting all wait statements in the definition of the task to continuation entry points, and re-organizing a control flow of the definition of the task, to produce a modified task; and converting the modified task into a finite state machine (FSM) description with a single entry point, where the continuation entry points are converted to explicit states in the FSM.

9. An apparatus for providing an interface between a test bench executing in a computer and a logic design executing in a hardware accelerator, the computer being coupled to the hardware accelerator, the apparatus comprising:

means for implementing a task server and a context memory in the hardware accelerator for a task, the task server configured for communication with the logic design;

means for generating a task stub configured for execution by the computer for the task, the task stub configured to receive calls to the task from the test bench and establish remote procedure call (RPC) channels in response to the calls; and means for transferring values of input arguments for the calls to the context memory through the RPC channels and triggering execution of threads of the task in the task server using the values of the input arguments in the context memory as parametric input.

10. The apparatus of claim 9, further comprising:

means for receiving an indication that the task server has completed execution of at least one of the threads of the task, obtaining, from the context memory through the RPC channel, values of the output arguments of the task generated by the at least one thread, and returning the values of the output arguments from the task stub to the test bench.

11. The apparatus of claim 9, wherein the task server comprises a finite state machine (FSM) with a single wait state, the FSM configured to transition from the wait state in response to any of the following events: a trigger event for triggering execution of a thread; or at least one time consuming event specified in the task.

12. The apparatus of claim 9, where the means for implementing the task server comprises:

means for converting all wait events in a definition of the task to a single wait point, converting all wait statements in the definition of the task to continuation entry points, and re-organizing a control flow of the definition of the task, to produce a modified task; and means for converting the modified task into a finite state machine (FSM) description with a single entry point, where the continuation entry points become explicit states in the FSM.

13. A logic verification apparatus, comprising:

a hardware accelerator having a logic design under verification, a task server, and a context memory implemented therein, the task server configured for communication with the logic design and configured to execute threads of a task, the context memory configured to store context variables for the threads executing on the task server; and a computer, coupled to the hardware accelerator, having a test bench, a task stub, a remote procedure call (RPC) memory, and a control module, where:

the task stub is configured to receive calls from the test bench and manage RPC channels in the RPC memory in response thereto;

the control module is configured to trigger execution of the treads of the task in the task server in response to the calls to the task received by the task stub, and transfer arguments of the task between the RPC memory and the context memory through the RPC channels.

14. The apparatus of claim 13, wherein the computer includes a simulation tool, and wherein the simulation tool is configured to transfer execution threads of at least one process in the test bench to threads of the task stub.

15. The apparatus of claim 13, wherein computer includes an RPC channel memory, and wherein the task stub is configured to establish the RPC channels by dynamically allocating an RPC channel from the RPC channel memory as each of the calls is received.

16. The apparatus of claim 13, wherein the task includes a set of context variables, the set of context variables including the input arguments and output arguments, and wherein the task server is configured to:

execute each of the threads; and store and retrieve values for at least a portion of the context variables in the context memory during execution of each of the threads.

17. The apparatus of claim 16, wherein the control module is further configured to:

receive an indication that the task server has completed execution of at least one of the threads of the task;

obtain, from the context memory through at least one of the RPC channels, values of the output arguments of the task generated by the at least one thread; and return the values of the output arguments from the task stub to the test bench.

18. The apparatus of claim 13, wherein the task server comprises a finite state machine (FSM) with a single wait state, the FSM configured to transition from the wait state in response to any of the following events: a trigger event for triggering execution of a thread; or at least one time consuming event specified in the task.

19. The apparatus of claim 18, wherein the task server is configured to execute each of the threads in response occurrence of the trigger event or the at least one time consuming event.

20. The apparatus of claim 13, wherein the hardware accelerator includes a behavior processor, and wherein the task server is implemented using the behavioral processor.

* * * * *